United States Patent [19]

Huey et al.

[11] Patent Number: 5,467,349

[45] Date of Patent: Nov. 14, 1995

[54] ADDRESS HANDLER FOR AN ASYNCHRONOUS TRANSFER MODE SWITCH

[75] Inventors: Henry E. Huey, Redondo Beach; Michael J. Nishimura, Torrance, both of Calif.

[73] Assignee: TRW Inc., Redondo Beach, Calif.

[21] Appl. No.: 171,942

[22] Filed: Dec. 21, 1993

[51] Int. Cl.$^6$ .................................................. H04L 12/56
[52] U.S. Cl. .............................................. 370/60.1; 370/60
[58] Field of Search ................... 370/94.1, 60.1, 370/58.1–58.3, 60, 94.2, 13, 17, 66, 68, 68.1, 82

[56] References Cited

U.S. PATENT DOCUMENTS

| | | | |
|---|---|---|---|
| 5,163,045 | 11/1992 | Caram et al. | 370/60.1 |
| 5,253,251 | 10/1993 | Aramaki | 370/94.1 |
| 5,271,010 | 12/1993 | Miyake et al. | 370/94.1 |
| 5,311,509 | 5/1994 | Heddes et al. | 370/94.1 |
| 5,323,389 | 6/1994 | Bitz et al. | 370/60.1 |

*Primary Examiner*—Douglas W. Olms
*Assistant Examiner*—Ajit Patel

[57] ABSTRACT

An improved address handling circuit includes a temporary storage device for temporarily storing at least one current cell, including a header, for address processing. A virtual channel (VC) filter is coupled to the temporary storage device and includes a VC address storage device for storing at least one selected virtual channel identifier (VCI), corresponding VC matching data and a corresponding cell identifier. The VC filter compares data from the header of the at least one current cell with the selected VCI to identify cells matching the at least one VCI. The VC filter includes a VC matching device for indicating a match. A virtual path (VP) filter is coupled to the temporary storage device and includes a VP address storage device for storing at least one selected virtual path identifier (VPI), corresponding VP matching data and a corresponding cell identifier. The VP filter compares the data from the header of the at least one current cell with the selected VPI to identify cells matching the at least one VPI. The VP filter includes a VP matching device for indicating a match. The VP filter has lower priority than said VC filter. A match priority device, coupled to the VC matching device of the VC filter and to the VP matching device of the VP filters, retrieves the matching data from a highest priority filter having a match.

44 Claims, 12 Drawing Sheets

ADDRESS HANDLER FOR AN ASYNCHRONOUS TRANSFER MODE SWITCH

BACKGROUND OF THE INVENTION

1. Technical Field

This invention relates generally to a data transfer switch and, more particularly, to an address handler for asynchronous transfer mode (ATM) switch.

2. Discussion

A common switch for voice, data and video traffic is needed to integrate communications systems to reduce costs and to improve performance. Voice traffic is typically carried on synchronous links by telephone switches, for example a Public Branch Exchange (PBX), which use dedicated channels which are time division multiplexed (TDM) to a higher frequency. These switches do not effectively utilize available bandwidth. The position of each channel in a frame is fixed, each frame occurs regularly, and individual channels can be identified by their position within a frame. Since the spacing for each channel is reserved regardless of whether the channel is being used, these switches do not effectively use available bandwidth. While being relatively inexpensive for voice communications, TDM is unsuited for bursty data traffic since bandwidth is allocated to each channel regardless of whether it is actually in use.

Local area networks (LAN) currently handle a large portion of data traffic. Because the prices of desktop computers and work stations continue to decline as their performance and availability increases, the need for higher network bandwidth increases. In addition, entirely new applications requiring even higher networking bandwidths are being developed to utilize the advanced performance and availability. For example, these new applications include imaging in electronic documents, visual modeling in real-time, and multi-media which integrates voice, video and data. These new applications, among others, require vastly improved networking capabilities than currently available because video and image data can consume large portions of bandwidth, can require fast and consistent response time (for example, two-way voice communication), and can require synchronization of voice, video, and data.

Conventional LAN networks include a plurality of nodes connected through a common channel having a fixed bandwidth. A sending node sends variable-length data packets to receiving node(s) using the address of the receiving node(s). Each variable-length packet typically includes a fixed header including address data and a variable length payload containing data. If the amount of data to be transmitted is large, a stream of data packets is sent.

Expected use of the common LAN network channels is statistical and not dedicated as with telephone switching systems. While, on average, each node is expected to use a percentage of the bandwidth of the common channel, actual use of the common channel is much more dynamic. Significant problems occur when multiple nodes send large data packets simultaneously. While one node is transmitting, other nodes cannot access the bandwidth. Since the nodes share the common channel with fixed bandwidth, the LAN network bandwidth can be easily exceeded. When the data packets are not received by the selected node, the data packets must be retransmitted by the sending node which further occupies the available bandwidth. One solution is to decrease the number of users per LAN network, however, increased cost of equipment and decreased ability to communicate with excluded nodes make this solution an unattractive alternative.

Conventional LAN networks are not suitable for carrying two-way, time-sensitive voice traffic. Because LAN networks typically lack a priority system, a variable length packet must essentially wait an indeterminate period until bandwidth is available. As such, time-sensitive traffic, for example a two-way conversation, will have undesirable delays.

An integrated network or switch fabric for carrying voice, video and data traffic, currently carried by different types of networks or switch fabrics requiring separate networks, is desirable. The separate networks or switches increase costs by requiring duplication of equipment. For multimedia applications, the voice, video and data are typically separated, transmitted on the separated networks and reassembled. As can be appreciated, reassembly and re-synchronization can be extremely complex.

Referring to FIG. 1, an asynchronous transfer mode (ATM) network 10, which can transfer voice, video and data traffic at high speed includes a plurality of ATM switches 12 for transferring fixed-length packets or cells of voice, video and data at very high speeds. Each cell includes a header containing address and priority information and a payload containing voice, video and data traffic.

ATM switches 12 can interface with other ATM switches via network to network interfaces (NNI) 14. ATM switch 12 can also interface with an end device or customer premises equipment (CPE) 16 via user to network interfaces (UNI) 18. Referring to FIG. 2, a standard ATM cell 22 typically includes a header 24 which includes 5 bytes and a data payload 26 which includes 48 bytes.

For example, UNI 18 can be virtual channels (VC), identified by a virtual channel identifier 30, which can be combined with each other to form the NNI 14 which can be a virtual path (VP), identified by a virtual path identifier 32. As can be appreciated, UNI 18 can be a VP since both VCs and VPs can originate from CPE. VCs are logic circuits which allow unidirectional flow capability for ATM cells. Referring to FIG. 2, standard ATM cell 22 includes VPI 32 including 8 or 12 bits and VCI 30 including 16 bits. VPs include groups of VCs having the same VPI 32. In other words, VPs are logical channel connections between two endpoints where the quality of service for all internal logical channel connections between the endpoints is maintained.

FIG. 3 illustrates network layering in an ATM switching system. Note that currently proposed ATM switching systems will be subscriber systems. In other words, a subscriber would contact a carrier or subscriber service to subscribe ATM switching service for a given period and for a given ATM cell transmission and reception rate prior to generating and outputting ATM cells containing voice, video and/or data traffic on ATM switching network 10. The subscriber or subscriber service could define maximum and/or average ATM cell transmission rates and destination(s) for the ATM cell data stream(s). The subscriber service could define the VCI 30 and the VPI 32 for each ATM cell data stream(s). The subscriber service would then set up ATM switching network 10 to translate each VPI and VCI as required to route the ATM cell data streams to the proper destination. ATM switching system 10 could operate automatically with subscribers electronically requesting service and the subscriber service electronically granting or denying the requested service.

As described above, VCs are logic circuits which allow unidirectional flow capability for ATM cells. VCs are terminated and initiated on ATM switches, routers and multiplexers (MUX) as needed. Each VC terminates when the VPI and/or VCI is translated or changed, as will be described below. Every time a VC is switched, an input VPI and/or VCI is translated or changed to an output VPI and/or VCI. Concatenations of VCs form a virtual channel link (VCL).

Virtual paths (VPs) and virtual path connections (VPCs) are logic circuits which also allow unidirectional flow capability for ATM cells. The VPC includes multiple VCLs having an identical virtual path identifier (VPI). VPIs are translated or changed at VP switching points in ATM switching system 10. Virtual path links (VPLs) are terminated when VPIs are assigned, translated, or removed.

For example, a first end user at a first virtual channel connection endpoint (VCCE$_1$) inputs and receives packets or cells on a first VCL using an address header with a VCI designated VCIa. A first virtual channel switch (VCSW$_1$) terminates VCIa and translates the address header of the ATM cells to VCIb. After flowing through the VPC, the VC designated VCIb are terminated at VCSW$_2$, the address header is translated to VCIc, and ATM cells 22 are routed to a second end user at VCCE$_2$.

Similarly, a third end user at a third virtual channel connection endpoint (VCCE$_3$) inputs and receives packets or cells on a second. VCL using an address header with a VCI designated VCIm. A third virtual channel switch (VCSW$_3$) terminates the VC designated VCIm and translates the address header of ATM cells 22 from VCIm to VCIn. After flowing through the VPC, the VC designated VCIn are terminated at VCSW$_4$, translated to VCIo and routed to a fourth end user at VCCE$_4$. Note that the first and second VCL are routed through the same VPC since they both have an identical VPI.

Referring to FIG. 4, a switching system for packets, for example fixed-length ATM cells, is shown and includes a plurality of input ports 50(1), 50(2), ..., and 50(N) connected by a switch fabric 54 to one or more output ports 58(1), 58(2), ..., and 58(M). Each input port 50 can include an address handler 62, a cell router 66, and a cell traffic policer 70. Address handler 62 evaluates header 24 of each cell 22 input thereto to validate cells for routing by cell router 66 and to detect invalid cells that are not routed. Cell router 66 provides address translation and internal address processing required for switch fabric 54. Payload 26 is generally not processed by ATM switching networks 10. Cell traffic policer 70 monitors input data streams including a plurality of cells 22 on a VP and/or VC basis at entry points to ATM switching network 10.

Input data streams input to input port 50 include a plurality of ATM cells 22 which are provided at a cell input rate. Cell policer 70 monitors ATM cell input rates to ensure one subscriber does not exceed a subscribed peak input data rate. Cell policer 70 can also monitor average input data stream rates if needed. Switch fabric 54 switches each ATM cell 22 to an output port 58 which is dependant upon routing information contained in the VCI and VPI.

Conventional ATM switching systems must terminate a VP in order to add or drop a VC therefrom which adds complexity and cost to the conventional ATM switching system. In other words, more VPs are used for a fixed number of CPE requiring VCs than are actually required. In addition, the address header for VPIs has been allocated a fixed number of bits. As use increases, the active number of VPs required in an ATM switching system may exceed the number of distinct VPIs.

Referring to FIG. 5, a prior art address handler 100 includes an input interface 104 connected to an idle cell filter 108 which removes idle ATM cells inserted in the input data stream (of multiple ATM cells) to maintain proper synchronization. The idle cells are sent to a cell disposal circuit 112. Non-idle ATM cells are sent to a VP filter circuit 116 which routes ATM cells having preselected VPIs to a VP routing circuit 120. VP cell routing circuit 120 does not modify the VCI for ATM cells routed thereto by VP filter circuit 116. An addressing table in VP filter circuit 116 contains the VPIs for the pre-selected VPIs to be routed. VPs are usually processed first since VP circuits must preserve the VCI field across the switched connection.

Non-idle and non-preselected VP ATM cells are sent to a VC filter circuit 124 which routes pre-selected VC ATM cells to a VC cell routing circuit 128. VC Filter circuit 124 similarly includes an addressing table containing VCIs for preselected VCs. Cells which have not been routed by either VP filter 116 or VC filter 124 are assumed to be invalid ATM cells which are output by VC filter circuit 124 to a cell error processing circuit 132. VC cell routing circuit 128 can modify the VPI and/or VCI.

Referring to FIG. 6, problems associated with the prior art address handler 100 are illustrated. An ATM switching system 140 according to the prior art includes ATM switches 138, 140 and 142 and first, second and third VPCs 144, 146 and 148 each containing one or more VCCs which interconnect a plurality of CPEs. Generally VPs or VPCs are set up between specific endpoints for the sole purpose of carrying VCCs between the endpoints. VCCs are not allowed to be added or dropped between the specific endpoints. VCCs are grouped by source and destination using point-to-point VPCs. Conventional ATM switching system 140 must terminate a VPC in order to add or drop a VCC therefrom which adds complexity and cost to ATM switching system 140. In other words, more VPCs are used for a fixed number of CPE requiring VCCs than are actually required. In addition, the address header for the VPI has been allocated a fixed number of bits. As use increases, the active number of VPs required in an ATM switching system may exceed the number of distinct VPIs.

Large private networks will want to logically interconnect their sites using VPCs which could use up the available VPI address space within certain switches located in the interior of a network of switches. VPCs are easier to provision and maintain so both CPE and network providers tend to rely on VPEs more than trying to manage the large addressing space of possible VCCs. Therefore, a need exists for more VPI space than VCI space but many systems have already allocated the address space for fixed purposes.

Therefore, it is desirable to decrease the number of VPs used in a given system to maximize use of available VPI and bandwidth. Furthermore, it is desirable to maximize use of the bits available for the VPI.

SUMMARY OF THE INVENTION

An address handling circuit for an asynchronous transfer mode switch processes a cell data stream including a plurality of cells. Each cell has a header portion with a virtual channel identifier (VCI) and a virtual path identifier (VPI) and a data payload portion. An improved address handling circuit includes a temporary storage device for temporarily storing at least one current cell for address processing. A virtual channel (VC) filter is coupled to said temporary storage device and includes a VC address storage device for storing at least one selected VCI, corresponding VC matching data and a corresponding cell identifier. The VC filter compares data from said header of said at least one current cell with said selected VCI to identify cells matching said at least one VCI. The VC filter includes a VC matching device for indicating a match. A virtual path (VP) filter is coupled to said temporary storage device and includes a VP address storage device for storing at least one selected VPI, corresponding VP matching data and a corresponding cell identifier. The VP filter compares said data from said header of said at least one current cell with said selected VPI to identify cells matching said at least one VPI. The VP filter includes a VP matching device for indicating a match. The VP filter has lower priority than said VC filter. A match priority device, coupled to said matching device of said filter, retrieves said matching data from a highest priority filter having a match.

According to one feature of the invention, said matching data includes an address storage portion identifying an address in one of said VC address storing device and said VP address storing device and wherein said cell identifier contains routing data.

According to another feature of the invention, said matching data includes a filter identification portion identifying one of said VC filter and said VP filter.

According to another feature of the invention, a plurality of sub-VP filters are provided to increase VP filtering and routing capability. Each sub-VP filter is coupled to said temporary storage device and includes a sub-VP address storage device for storing at least one selected sub-VPI, corresponding sub-VPI matching data and a corresponding cell identifier. Each filter compares data from said header of said at least one current cell with said at least one selected sub-VPI to identify cells matching said at least one sub-VPI. Each filter includes a sub-VPI matching device for indicating a match.

Other objects, features and advantages will be readily apparent.

BRIEF DESCRIPTION OF THE DRAWINGS

The various advantages of the present invention will become apparent to those skilled in the art after studying the following specification and by reference to the drawings in which.

DETAILED DESCRIPTION OF THE PREFERRED EMBODIMENTS

While the description above and below is illustrated using fixed-length ATM cells 22, one skilled in the art can appreciate that the present invention has application to variable-length packets or cells.

Figure 6:
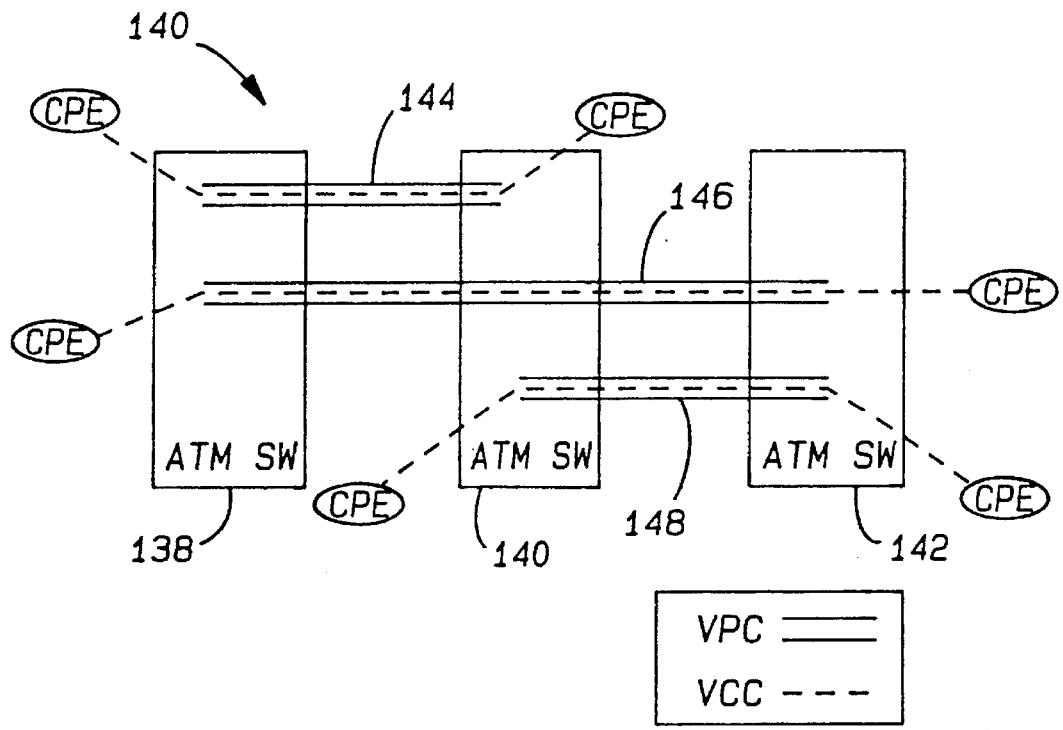
FIG. 6 illustrates an ATM switching system according to the prior art and including three ATM switches, and three virtual path connections each containing one or more virtual channel connections.
Figure 7:
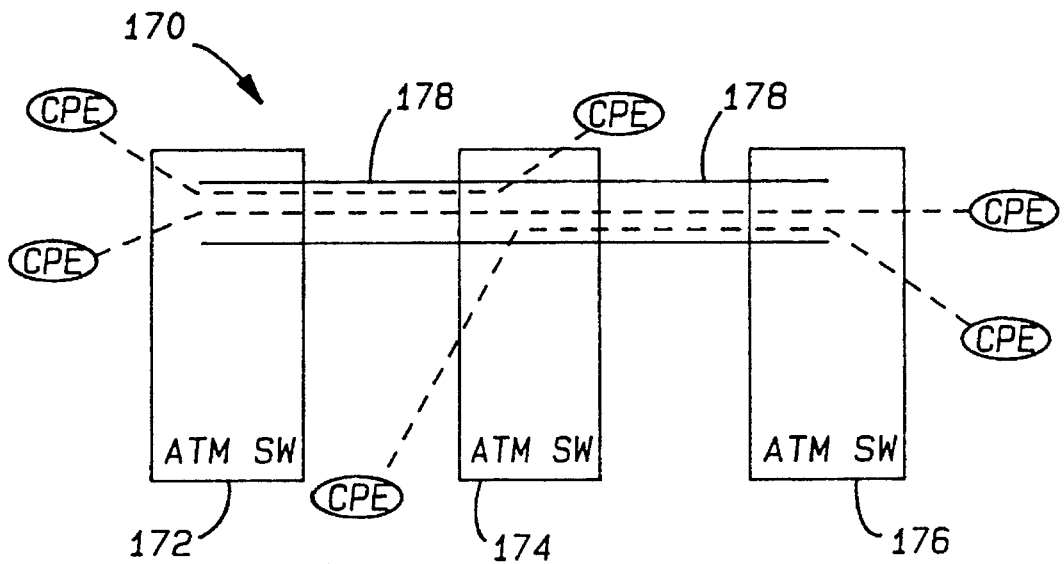
FIG. 7 illustrates an ATM switching system using an address handling circuit according to the present invention to reduce the number of virtual path connections required.

Referring to FIG. 7, using an address handling circuit according to the invention and described below in detail, the number of VPs or VPCs can be reduced to provide more efficient use of an ATM switching network 170 including three ATM switches 172, 174, and 176. One VPC can be used to provide the same VPC and VCC provided by prior art ATM switching circuit of FIG. 6.

FIG. 7 illustrates how a single VC can be used to carry VCCs between CPE sites using an add/drop VPC approach. Note that any change to the overall bandwidth of VPC 178 could require policing actions at the input ports as well as resource management actions in order to meet the quality of service of the logical VPC and VCC. In general, this requires that all input ports be capable of traffic policing in order to define a very flexible usage of the network that allows VC add/drop at any input port. However, there are significant advantages in being able to provision circuits on a bandwidth as need basis. Additionally, the add/drop method can save on the total number of traffic policing monitoring points in a network over conventional VP and VC logical circuits. For example, if VPC path traffic monitoring is performed on the conventional method shown in FIG. 6, three VPC traffic monitoring circuits would have to be used and managed, two at ATM switch 140 and one at ATM switch 142. However, for the add/drop configuration shown in FIG. 7, only two VPC monitoring circuits need to be used and managed, one at ATM Switch 174 and one at ATM switch 176.

Figure 8:
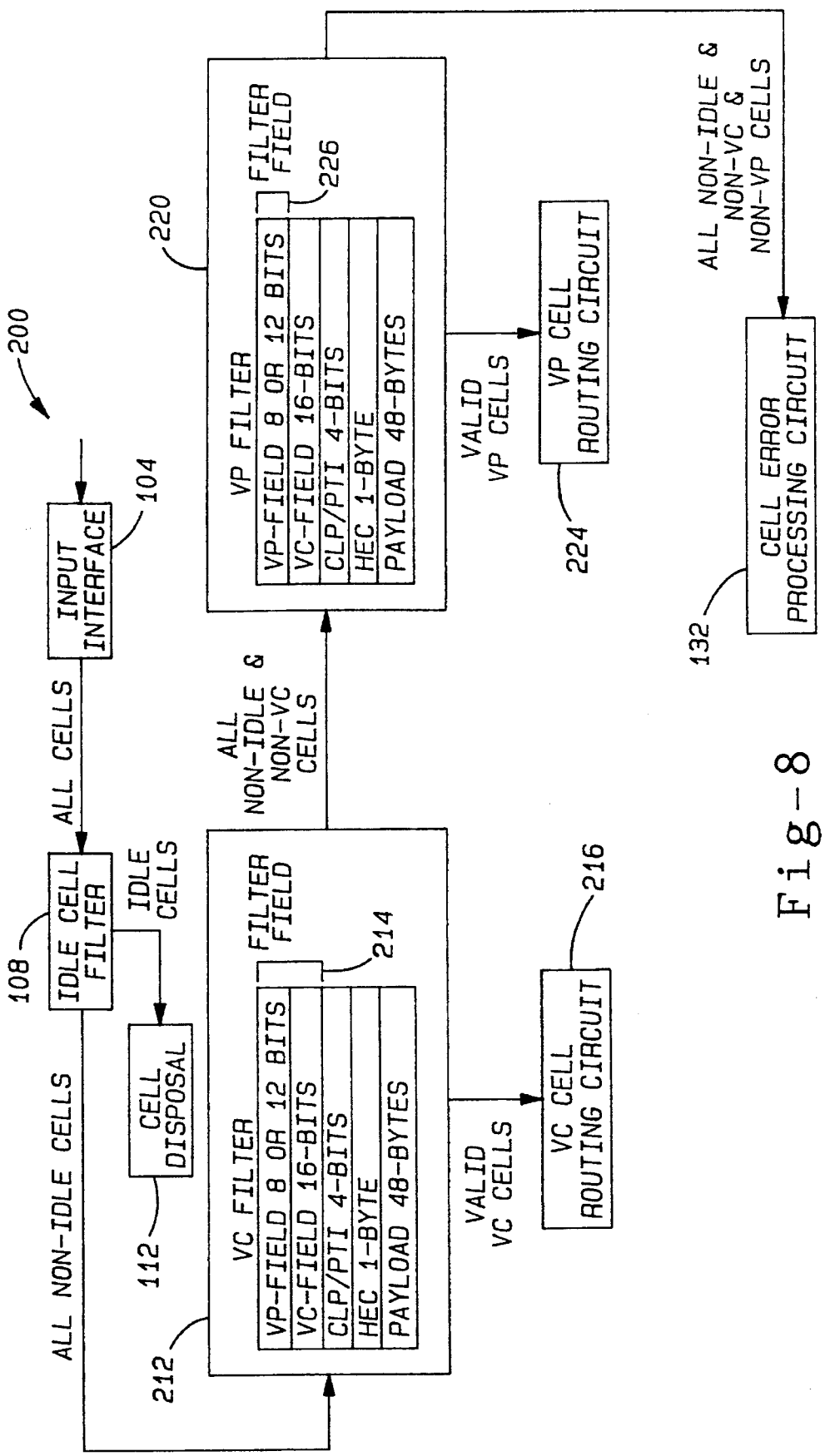
FIG. 8 is a functional block diagram of a first address handling circuit according to the present invention for routing virtual path and virtual channel cells.

Referring to FIG. 8, an address handling circuit 200 according to the invention reduces the number of VPC required by allowing VC add/drop without requiring termination of a VPC. An ATM switching system 204 incorporating address handling circuit 200 reduces the number of VPC required for the configuration shown in FIG. 6 from three to one. Other configurations could experience higher reductions in the number of VPC.

Figure 5:
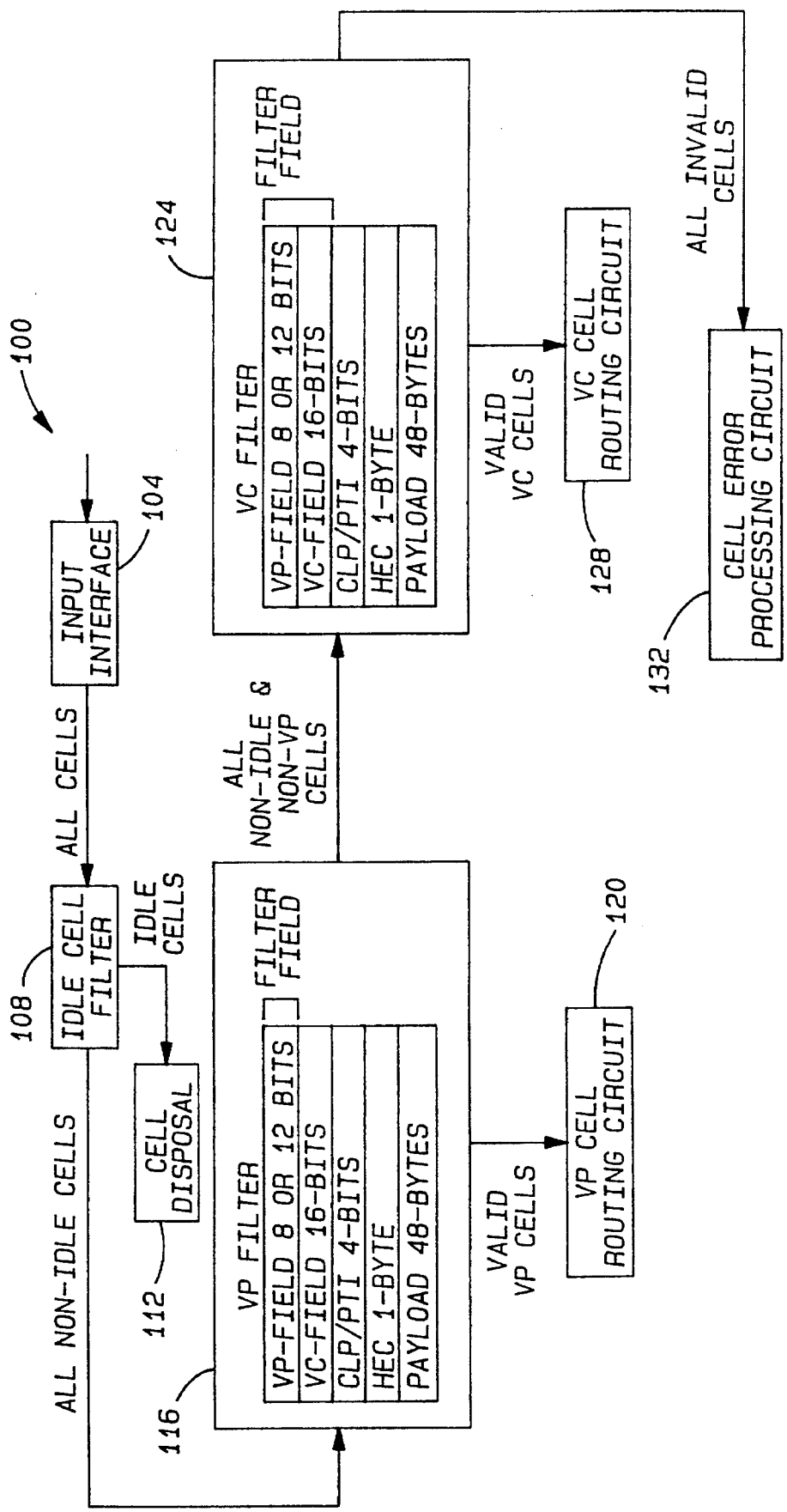
FIG. 5 is a functional block diagram of a prior art address handling circuit for routing virtual path cells and virtual channel cells.

For purposes of clarity, reference numbers from FIG. 5 will be used in FIG. 8 where appropriate. Address handling circuit 200 includes input interface 104 connected to idle cell filter 108 which removes idle ATM cells inserted in the input data stream (of multiple ATM cells) to maintain proper synchronization. The idle cells are routed to cell disposal circuit 112. Non-idle ATM cells are sent to a VC filter circuit 212 which routes ATM cells having preselected VPIs and/or VCIs to a VC cell routing circuit 216. VC filter 212 includes a filter field 214 which monitors VPIs and VCIs. Note that VPI is 8 or 12 bits in length, 8 bits (256 VP circuits) for access or 12 bits (4096 VP circuits) for trunking. An addressing table in VC filter circuit 212 contains the VPIs and/or VCIs for the pre-selected VCs to be routed.

Non-idle and non-preselected VC ATM cells are sent to a VP filter circuit 220 which routes pre-selected VP ATM cells to a VP cell routing circuit 224. VP filter circuit 220 similarly includes an addressing table containing VPIs for preselected VPs. VP filter 220 includes a filter field 226 which monitors VPIs. Cells which have not been routed by either VC filter circuit 212 or VP filter circuit 220 are assumed to be invalid ATM cells which are output by the VP filter circuit 220 to a cell error processing circuit 132.

Figure 9A:
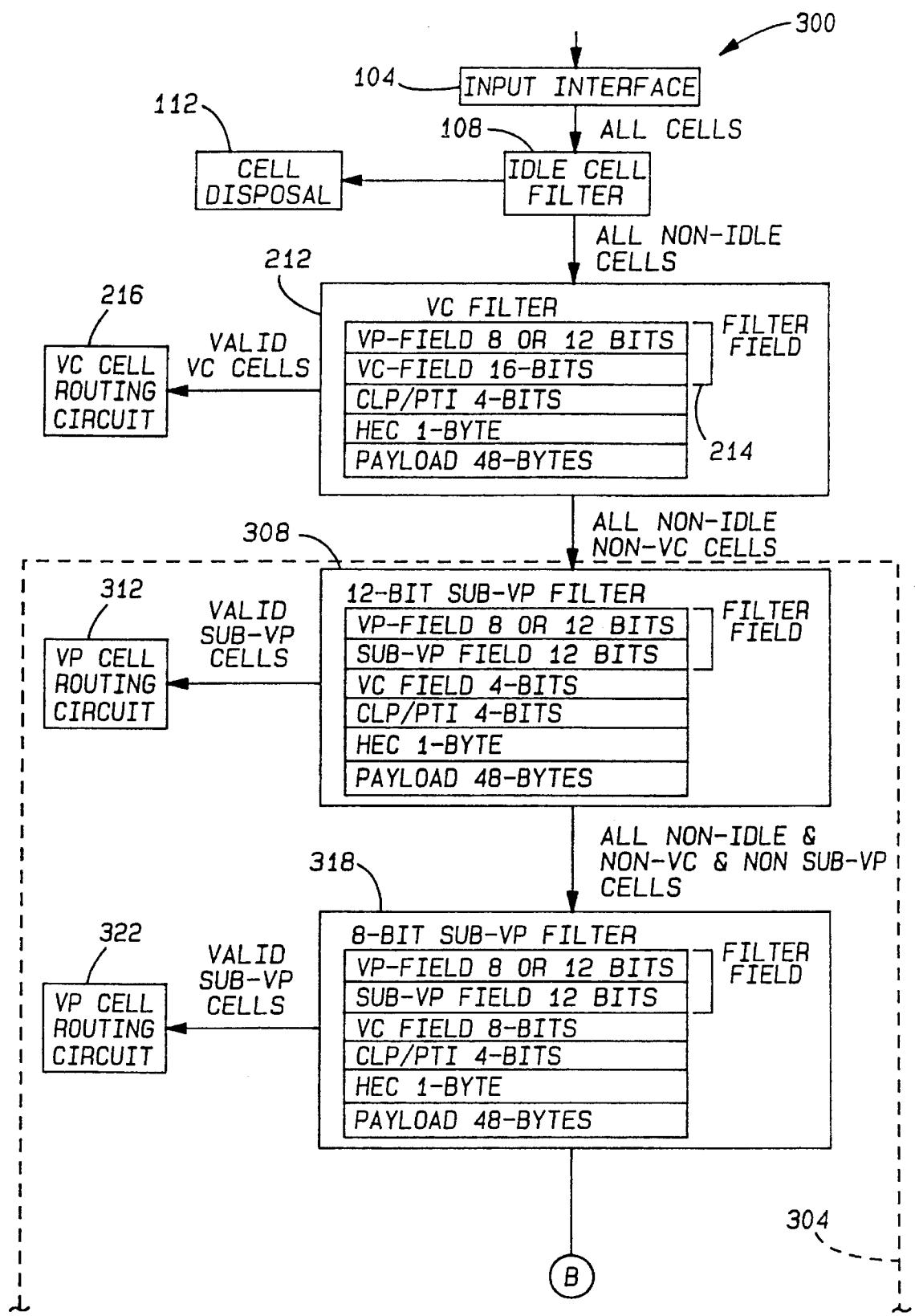
FIGS. 9A and 9B are functional block diagram of an address handling circuit according to the present invention and including a sub-VP address handling circuit to allow use of bits from the VCI subfield to increase the VPI subfield.

In FIG. 9A, an alternate embodiment of an address handling circuit 300 according to the invention is shown. For purposes of clarity, reference numbers from FIGS. 5 and 8 will be used where appropriate. Address handling circuit 300 includes the input interface 104 connected to idle cell filter 108 which removes idle ATM cells inserted in the input data stream to maintain proper synchronization. The idle cells are routed to cell disposal circuit 112, Non-idle ATM cells are sent to VC filter circuit 212 which routes ATM cells having preselected VPIs and/or VCIs to a first output which is connected to a VC cell routing circuit 216. VC cell routing circuit 216 does not modify VPI or VCI subfields for ATM cells routed thereto by VP filter circuit 220. An addressing table in VC filter circuit 212 contains (FIG. 9A) the VPIs and/or VCIs for the pre-selected VCIs to be routed.

Figure 9B:
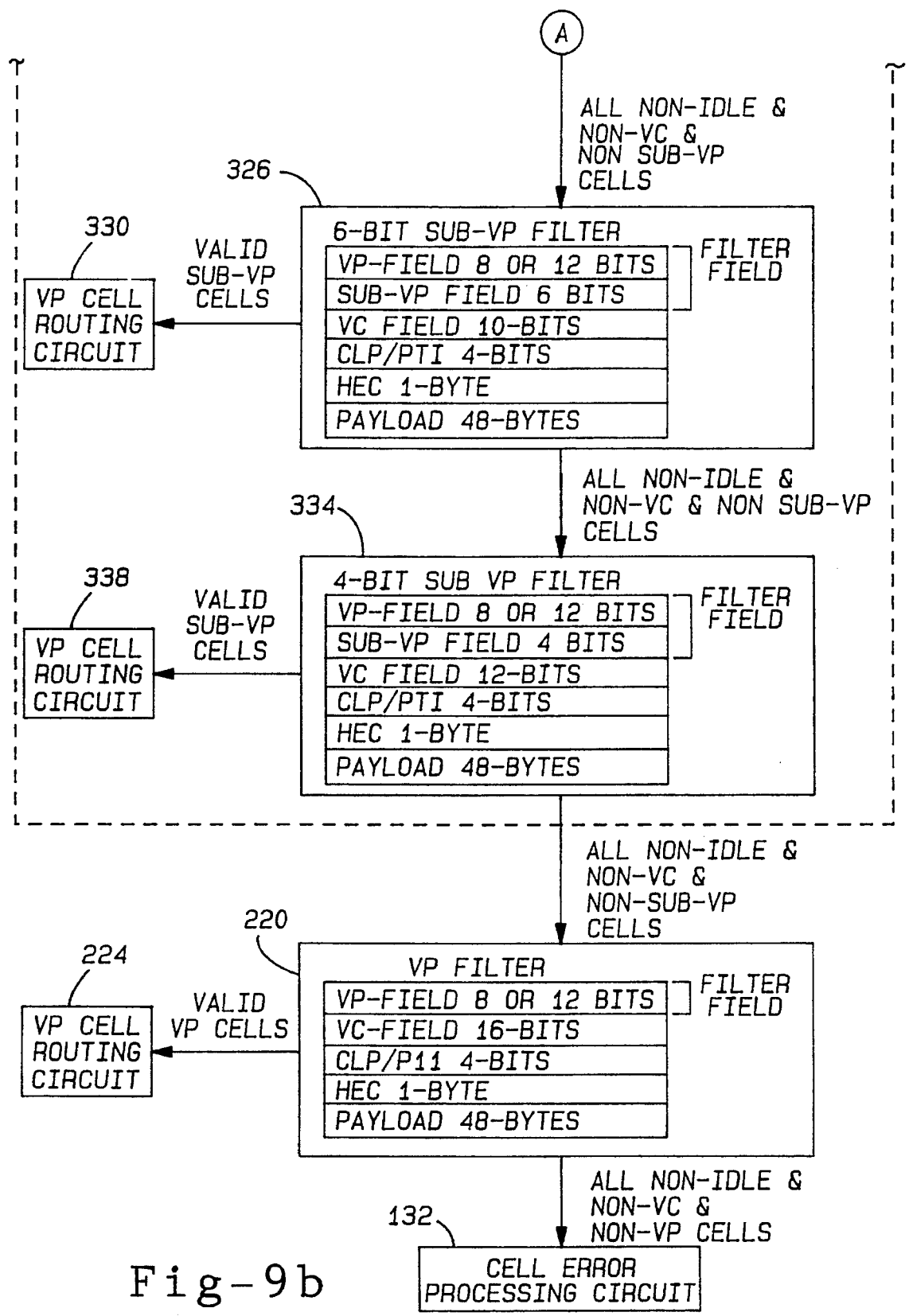

FIG. 9B illustrates a sub-VP address handling circuit 304 positioned between VC filter 212 and VP filter, 220 which allows use of bits from the VCI subfield to increase the size of the VPI subfield. As described above, normally the VPI subfield is limited to 8 bits for access (256 VP circuits) or 12 bits for trunking (4096 circuits). Using sub-VP address handling circuit 304, the VPI subfield can be extended an additional 4 to 12 bits or 16 to 4096 times the normal number of VPIs supported using VCI bits alone. In other words, using the standard ATM cell 22, if the VP field is 8 or 12 bits and a sub-VP field is 8 bits, then the VCI field is 8 bits.

Non-idle and non-preselected VC ATM cells are sent a second output of VC filter 212 which is connected to an output of sub-VP address handling circuit 304 including a first sub-VP filter circuit 308 which routes pre-selected first sub-VP ATM cells to a first output which is connected to a first VP cell routing circuit 312. First sub-VP filter circuit 308 can monitor 12 bits borrowed from the VCI subfield. In other words, sub-VP filter circuits 308 uses 12 bits of the 16 bit VCI field. Therefore the VCI field is 4 bits in sub-VP filter circuit 308. The first sub-VP filter circuit 308 includes an addressing table containing 12-bit first sub-VPI for preselected first sub-VP ATM cells.

Non-idle, non-preselected VCs, and non-first sub-VP ATM cells are sent to a second output of first sub-VP filter circuit 304 which is connected to an input of second sub-VP filter circuit 318 which routes pre-selected second sub-VP ATM cells to a first output which is connected to a second VP cell routing circuit 322. Therefore the VCI field is 8 bits in the second sub-VP filter circuit 318. Second sub-VP filter circuit 318 borrows 8 bits of the 16-bit VCI. Second sub-VP filter circuit 318 includes an addressing table containing 8-bit second sub-VPI for preselected second sub-VP ATM cells.

Non-idle, non-preselected VCs, non-first sub-VP, and non-second sub-VP ATM cells are sent to a second output of said second sub-VP filter circuit 318 which is connected to a third sub-VP filter circuit 326 (FIG. 9B) which routes pre-selected third sub-VP ATM cells to a first output which is connected to a third VP cell routing circuit 330. Third sub-VP filter circuit 326 borrows 6 bits of the 16-bit VCI. Therefore the VCI field is 10 bits in the third sub-VP filter circuit 326. The third sub-VP filter circuit 326 includes an addressing table containing 6-bit third sub-VPI for preselected third sub-VP ATM cells.

Non-idle, non-preselected VCs, non-first sub-VP, non-second sub-VP, and non-third sub-VP ATM cells are sent to a second output of third sub-VP filter circuit 326 which is connected to a fourth sub-VP filter circuit 334 (FIG. 9B) which routes pre-selected fourth sub-VP ATM cells to a first output of said fourth sub-VP filter circuit 334 which is connected to a fourth VP cell routing circuit 338. Therefore the VCI field is 12 bits in the fourth sub-VP filter circuit 334. Fourth sub-VP filter circuit 334 borrows 4 bits of the 16-bit VCI. Fourth sub-VP filter circuit 334 includes an addressing table containing 4-bit fourth sub-VPI for preselected fourth sub-VP ATM cells. While sub-VP filters 308, 318, 326 and 334 monitor 12, 8, 6 and 4 bits, respectively, sub-VP filters 308, 318, 326 and 334 could monitor other numbers of bits. Additional sub-VP filters could be used if desired. VP filter 220 and VP routing circuit 224 operate as previously described.

Cells which have not been routed by either the VC filter circuit 212 FIG. 9A, sub-VP filter circuits FIG. 9B, 308, 318, 326 and 334, or VP filter circuit 220 are assumed to be invalid ATM cells which are output by VP filter circuit 220 to a cell error processing circuit 132.

FIG. 9B shows that if sub-VP address filters are placed between the VC and VP Filters, then additional VPs can be created with an effective increased VPI subfield that uses bits from the VCI subfield. For example, an 8-bit sub-VP filter provides 16 bits of access VPIs, or 65,536 VPIs, or up to 20 bits of trunking VPIs which is over a million VPIs. However, the VCI address space is limited to the least 8 bits or 256 VCIs per VPI. It should be noted that the size of the VP subfield can be any size less than the maximum number of bits available in the VCI subfield. Per the above example, a VP subfield extension can be constructed with size from 1 to 15 bits. The address handler in FIG. 9B contains the same elements and functions as described with respect to the address handler of FIG. 8 except for the addition of VP subfilters inserted between the VC and VP address filters.

Figure 10A:
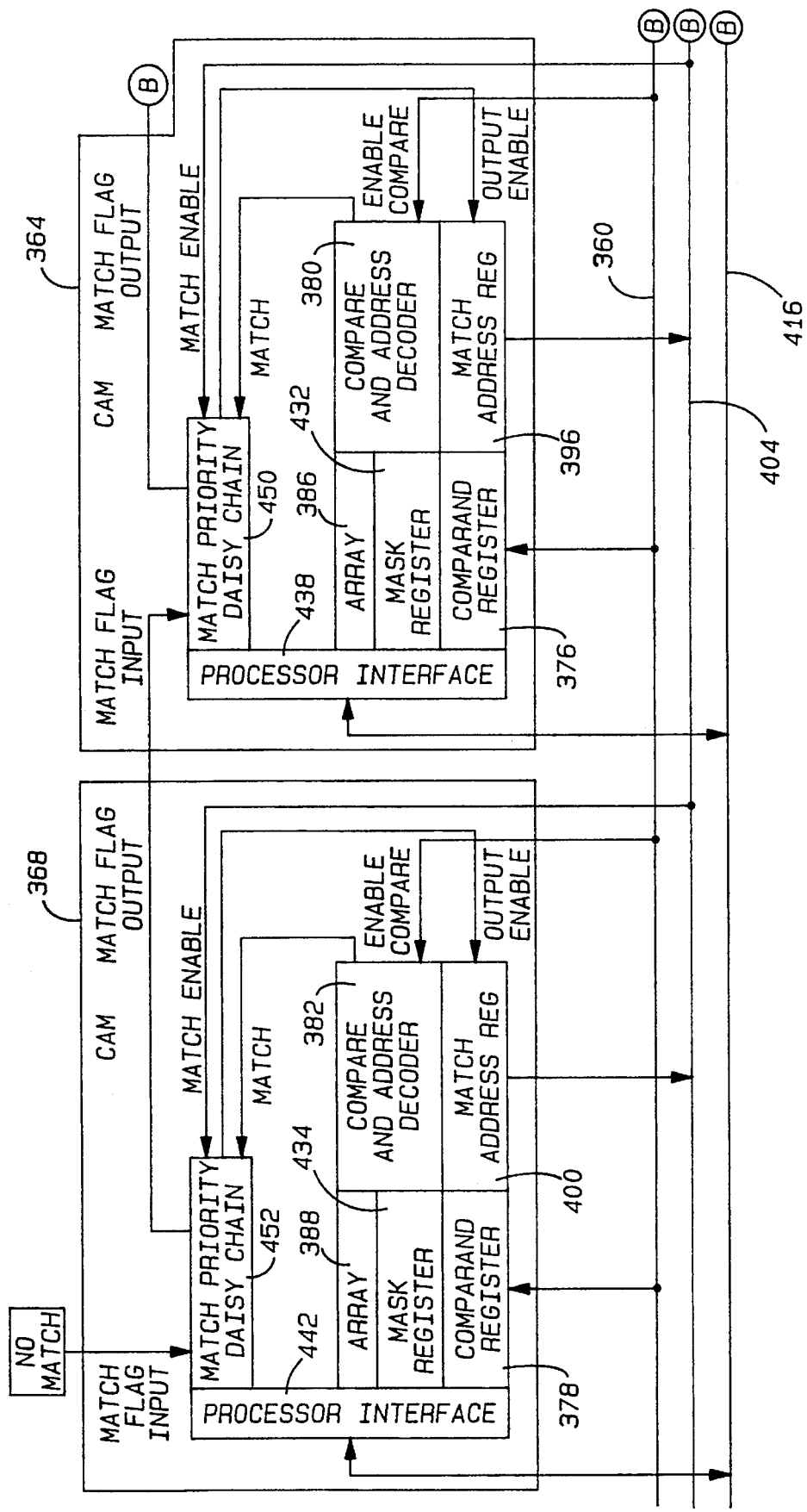
FIGS. 10A and 10B are logic diagrams of an address handling circuit which parallels operation of the address handling circuit of FIG. 8.
Figure 10B:
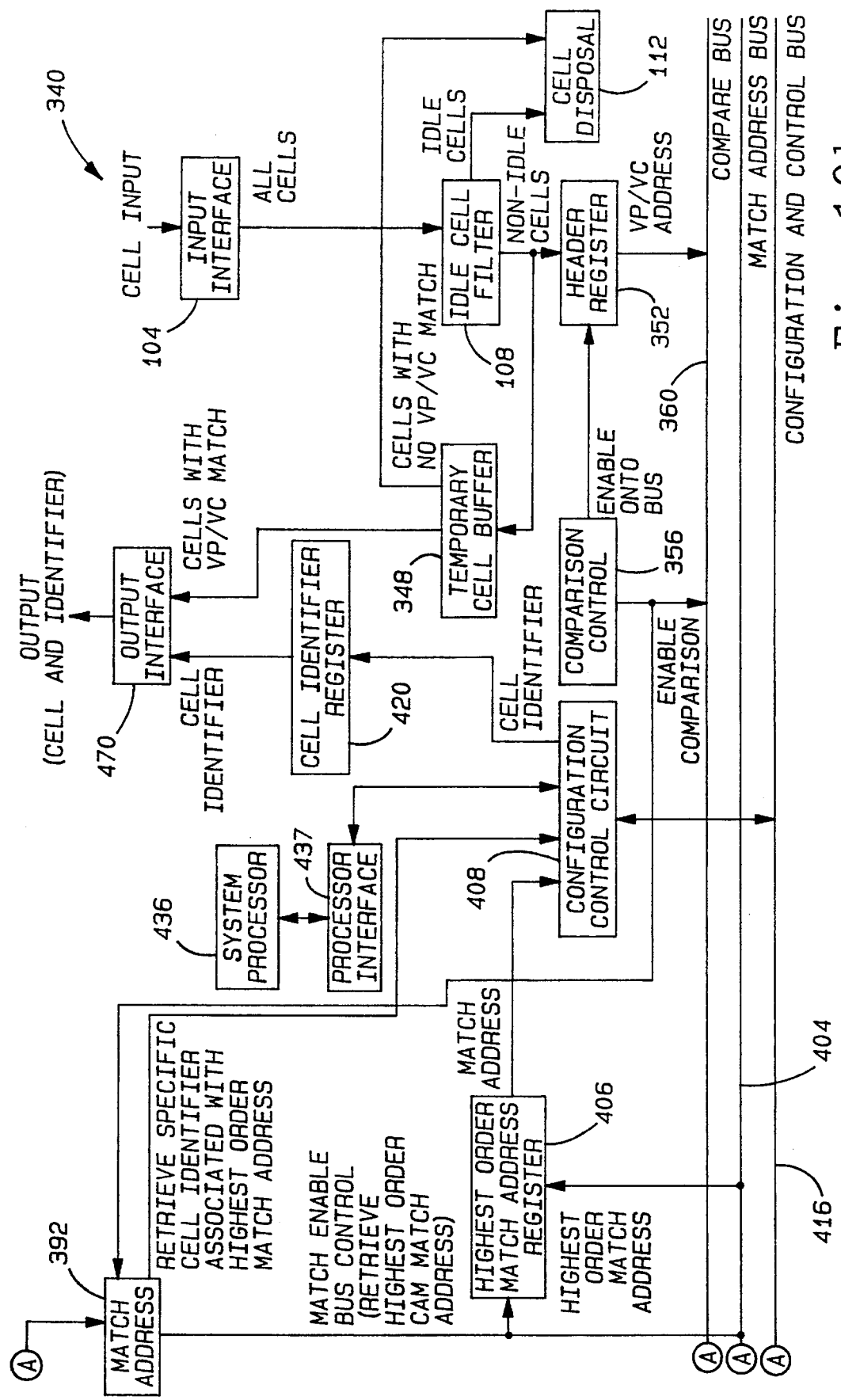

FIGS. 10A and 10B are detailed logic diagrams of an address handling circuit 340 which parallels operation of address handling circuit 200 of FIG. 8 and which provides VC add/drop capability without VP termination. While the data format is described below using the ATM cell 22 with five bytes of header 24 and 48 bytes of data payload 26, those skilled in the art can appreciate that other fixed cell sizes or variable-length packets can be used. The five byte header 24 includes VPI subfield 32 and VCI subfield 30 used for address validity checking and device routing.

Figure 1:
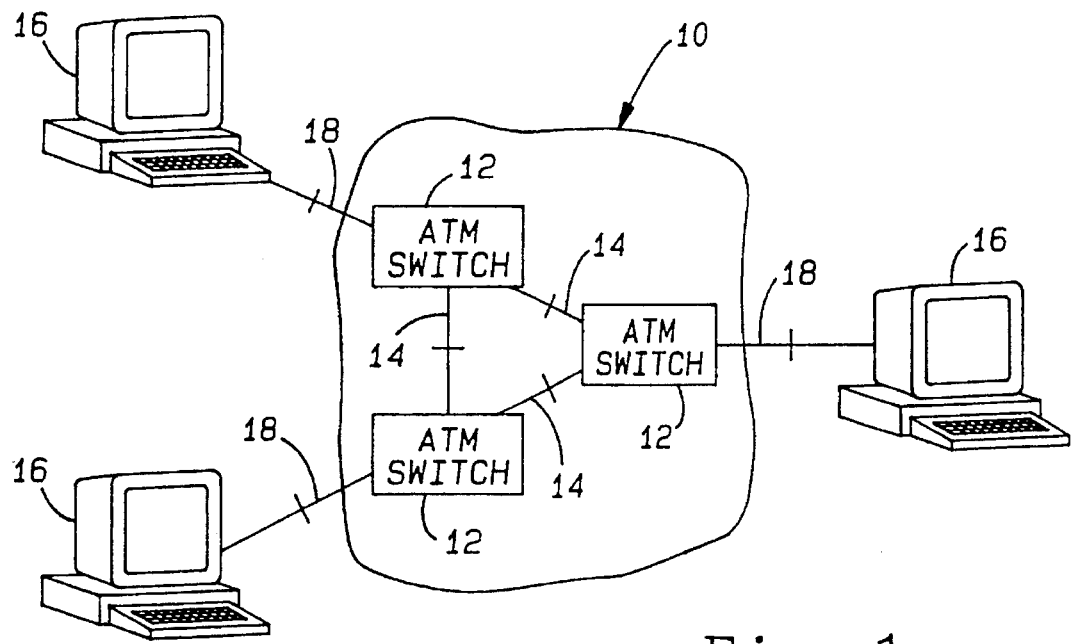
FIG. 1 is a functional block diagram of an asynchronous transfer mode (ATM) network according to the prior art.
Figure 2:
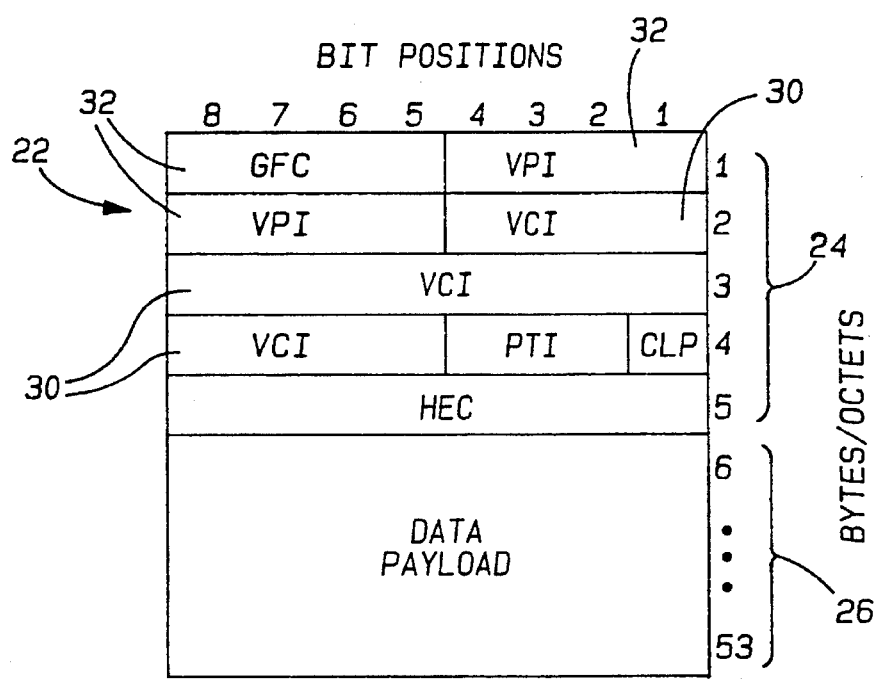
FIG. 2 illustrates a standard ATM cell including a header portion and a data payload portion.
Figure 3:
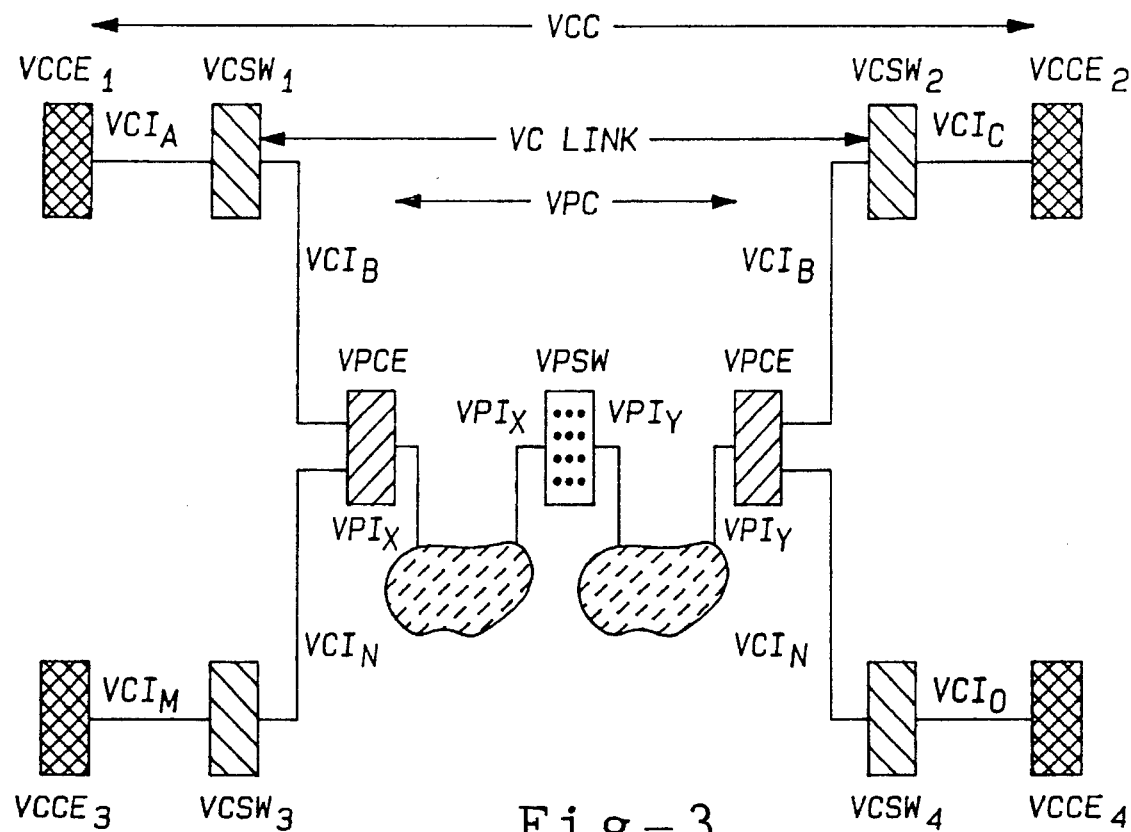
FIG. 3 illustrates virtual paths (VPs) and virtual channels (VCs) in an ATM switching network according to the prior art.
Figure 4:
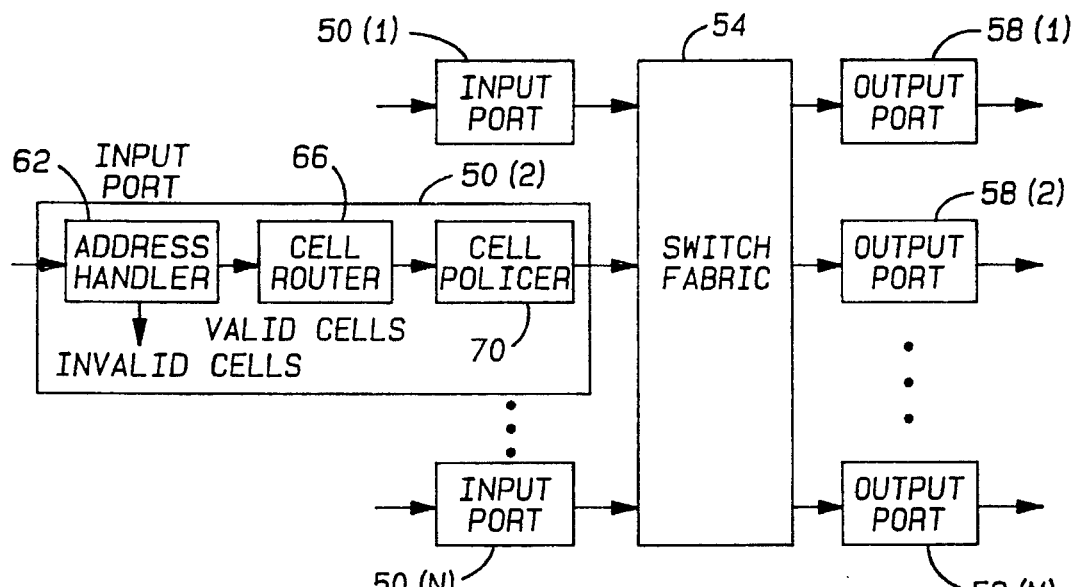
FIG. 4 is a functional block diagram of an ATM switching system including an input port, a switch fabric, and an output port according to the prior art.

Input interface 104 is a cell based interface that can be an electrical or optical, serial or parallel interface which receives the incoming cell under a controlled transfer. The incoming cells pass through idle cell filter 108 that uses a known VPI/VCI address code to delete (e.g. into cell disposal circuit 112) all filler cells from the cell data stream. Software logic of the idle cell filter 108 is programmable and expects the format of the cell to conform with FIG. 2. The remaining non-idle cells are then transmitted to a temporary cell buffer 348 that holds the cell until the VPI/VCI address is confirmed as will be described further below.

The ATM cell header 24, minus the HEC byte, is simultaneously loaded into a header register 352. The entire ATM cell header 24 can be used for comparison or selected fields or bits of the header can be used. For the purposes of discussion, the VPI/VCI subfields will be loaded into header register 352 and used for comparison. One skilled in the art will appreciate that the invention can apply to all combinations of the ATM cell header fields and/or bits. In addition, comparison of the VPI/VCI subfields takes place in real time. If many VCI/VPI subfields are simultaneously loaded, an address field for locating cells within temporary cell buffer 348 could also be used.

A comparison control circuit 356 enables header register 352 so that the VPI/VCI subfields are output onto a compare bus 360. Content addressable memory circuits (CAMs) 364 and 368 load the VPI/VCI address from compare bus 360 into comparand registers 376 and 378. CAM 364 could perform VP filter functions and CAM 368 could perform VC filter functions. CAMs 364 and 368 compare the VP/VC address, using compare and address decoder circuits 380 and 382, against VC/VP addresses stored in arrays 386 and 388 and determine if there is a match. A match by any of CAMs 364 and 368 is signaled to a match address circuit 392. Match address circuit 392 then enables the highest priority CAM that has a match. The contents of the match address register of the highest priority CAM is output onto a match address bus 404. In the example configuration of FIGS. 10A and 10B, CAM 368 (corresponding to a VC filter) could have priority over CAM 364 (corresponding to a VP filter). The match address contains a CAM identifier, used to specify the highest priority CAM, and an array address of the matching data in the highest priority CAM. The match data is transmitted by highest priority match address register 406 to a configuration and control circuit 408, which then queries the highest priority CAM, using the match address, for the cell identifier (or routing data) stored with the VP/VC header in the array (386 or 388) of the highest priority CAM (using the array address). The cell identifier or routing data is output onto configuration and control bus 416 and loaded into a cell identifier register 420 by configuration and control circuit 408. If CAMs 364 and 368 do not signal a VP/VC address match, then compare control circuit 356 instructs temporary cell buffer 348 to discard the stored cell.

The logic in CAMs 364 and 368 identifies the generic functionality found within CAM ICs. CAMs 364 and 368 include comparand registers 376 and 378, mask registers 432 and 434, CAM arrays 386 and 388, compare and address decoders 380 and 382, and match address registers 396 and 400. A CAM system processor 436 connected to processor interfaces 437, 438 and 442 is used to configure arrays 386 and 388, and mask registers 432 and 434, and to control the CAM's operation. The basic function of CAMs 364 and 368 is to compare the data (for example, VPI/VCI to be routed) stored in arrays 386 and 388 with the data (for example, VPI/VCI of the ATM cell stored in temporary cell buffer 348) in comparand registers 376 and 378. If compare and address decoders 380 and 382 detect a match, the matching data is loaded into match address registers 396 and 400 and the CAM (where the match occurred) signals a match via a match flag output indicator.

Mask registers 432 and 434 allow specific bits of comparand registers 376 and 378 to be set as "don't care" bits. Mask registers 432 and 434 mask out portions of the header to limit the range of VPI and/or VCI addresses used and to allow matches to be made on portions of the VPI or VCI subfields. Data in mask registers 432 and 434 is loaded from system processor 436 and address handler processor interface 437 via processor interfaces 438 and 442.

System processor 436 and processor interface 437 control all configurational data transfers to and from arrays 386 and 388. Inputs to arrays 386 and 388 from system processor 436 and processor interface 437 include the match addresses and corresponding routing data, and are accomplished via configuration and control bus 416.

The CAMs support cascading via match priority daisy chain circuits 450 and 452, so that multiple CAMs can be chained together and function as a CAM system. The cascading function connects intermediate CAM match flag outputs to CAM match flag input indicators such that the first CAM in the chain (the CAM which has its match flag input hard wired to "no match" e.g. CAM 368 in FIGS. 10A and 10B) has the highest priority, and the last CAM in the chain (the CAM which has its match flag output connected to the external control logic e.g. CAM 364 in FIGS. 10A and 10B) has the lowest priority. When multiple CAM ICs have a "match", only the CAM having the highest priority will enable the output of the match address register (e.g. matching data) onto match address bus 404.

Processor interface 437 allows functional configuration of the CAM and downloading of cell address and cell identifier data from system processor 436 to any of the CAM devices. Configuration and control circuit 408 handles the transfer of the data onto configuration and control bus 416. CAM register address and CAM memory space internal addressing within processor interface 438 are used to ensure that the transfer reaches the correct CAM and correct memory area within the CAM.

An output interface 470 adds a cell identifier, stored in cell identifier register 420, to the original cell stored in temporary cell buffer 348. The cell identifier data is used for routing within a switching or multiplexing device and the size of cell identifier data depends on the internal architecture of the switch or multiplexer. The cell identifier data can be stored within any of the header fields of the cell, especially within any unused fields such as the HEC byte, can be appended to the beginning or end of the cell, can be used to modify the header field or can be sent as a seperate control signal. However, for VP logical circuits, the VCI subfield must be preserved. Output interface 470 provides the physical and electrical/optical output interface with the rest of the switch or multiplexer. These interfaces can be either serial or parallel.

While address handling circuit 340 of FIGS. 10A and 10B is implemented with CAMS 364 and 368 connected in parallel and with a priority circuit or system, CAMs 364 and 368 could also be connected in series as shown in FIG. 8 if desired.

Figure 11A:
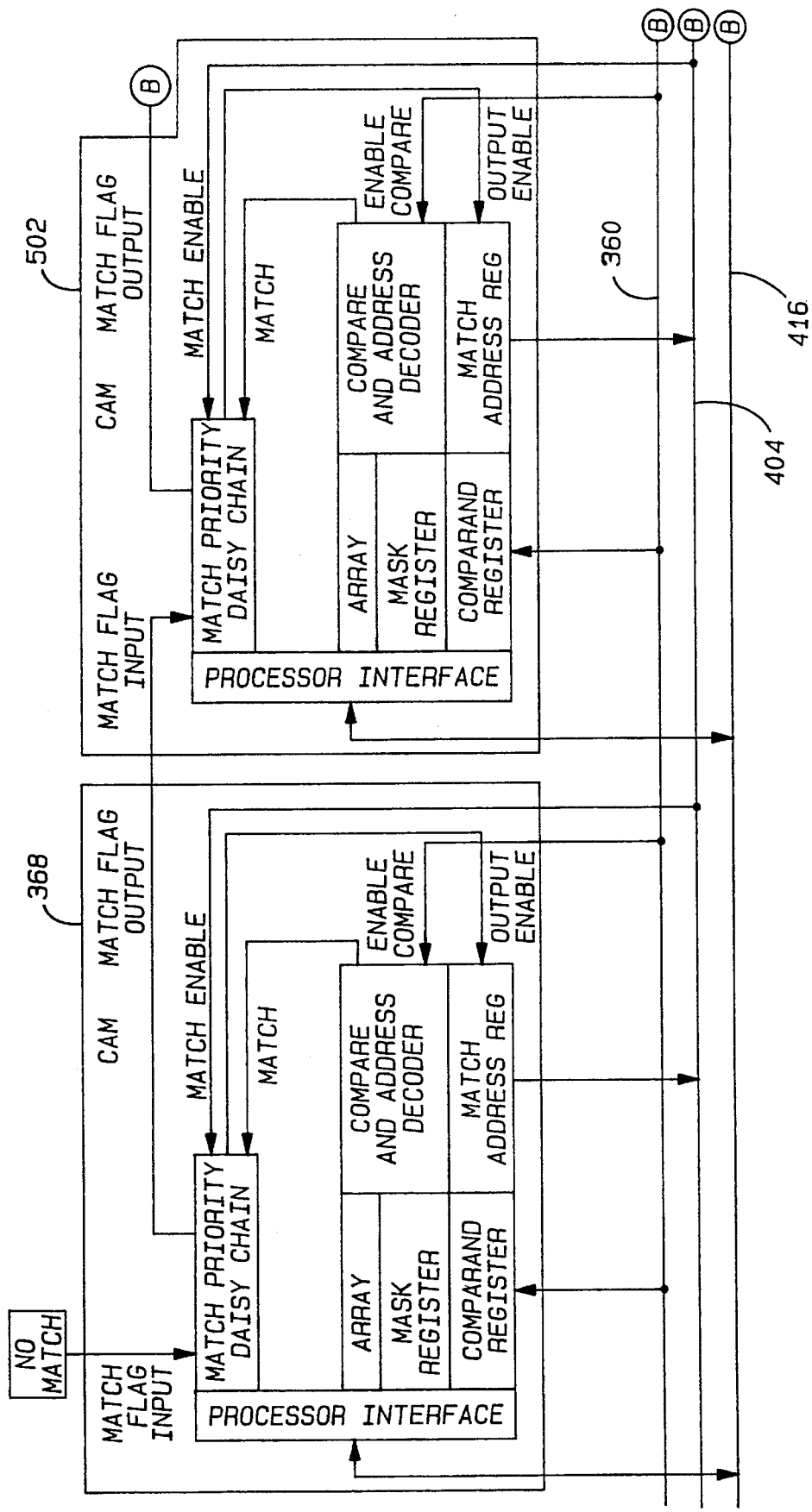
FIGS. 11A, 11B and 11C are logic diagrams of an address handling circuit which parallels operation of the address handling circuit of FIG. 9 including sub-VP routing.
Figure 11B:
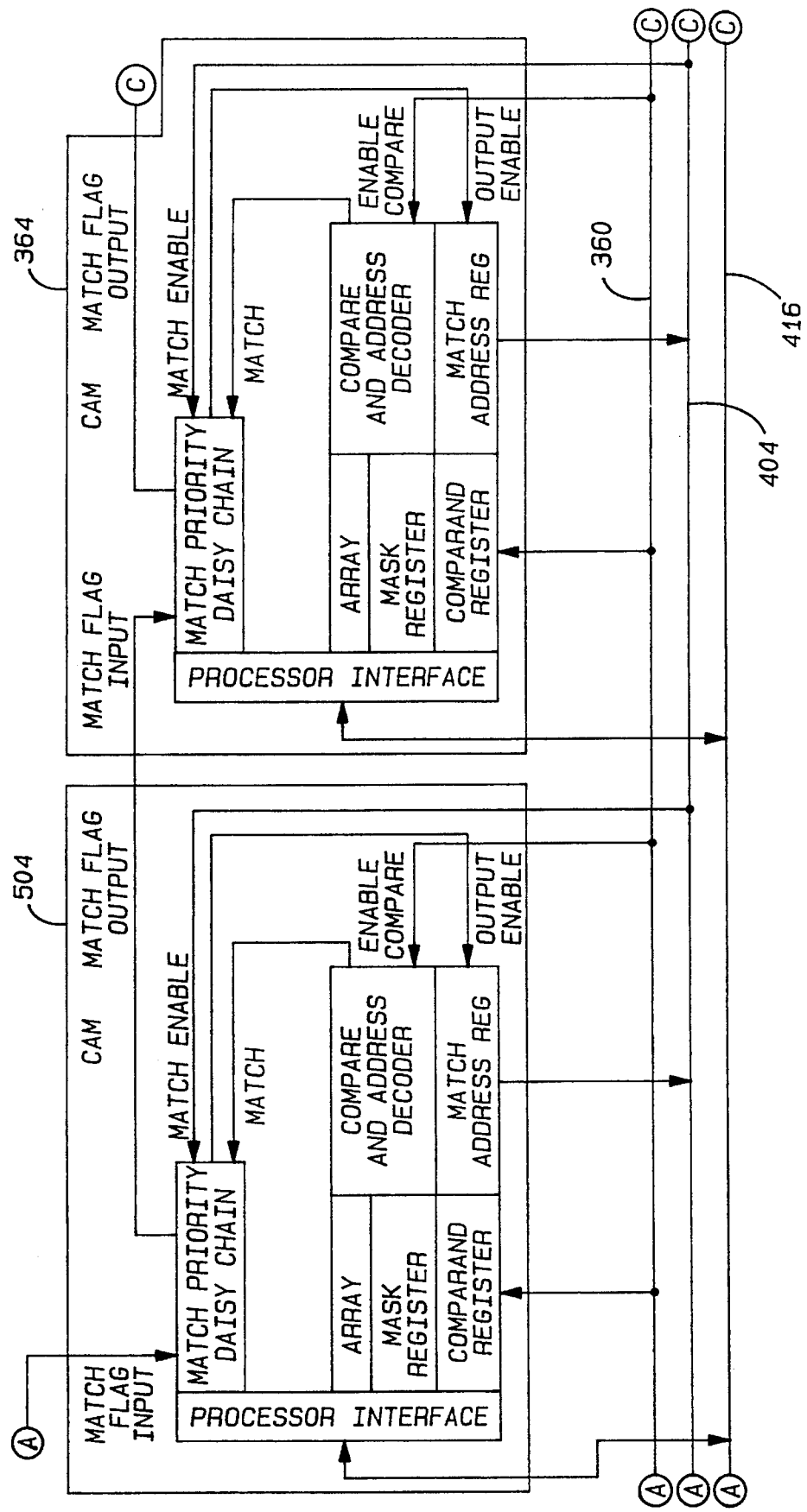
Figure 11C:
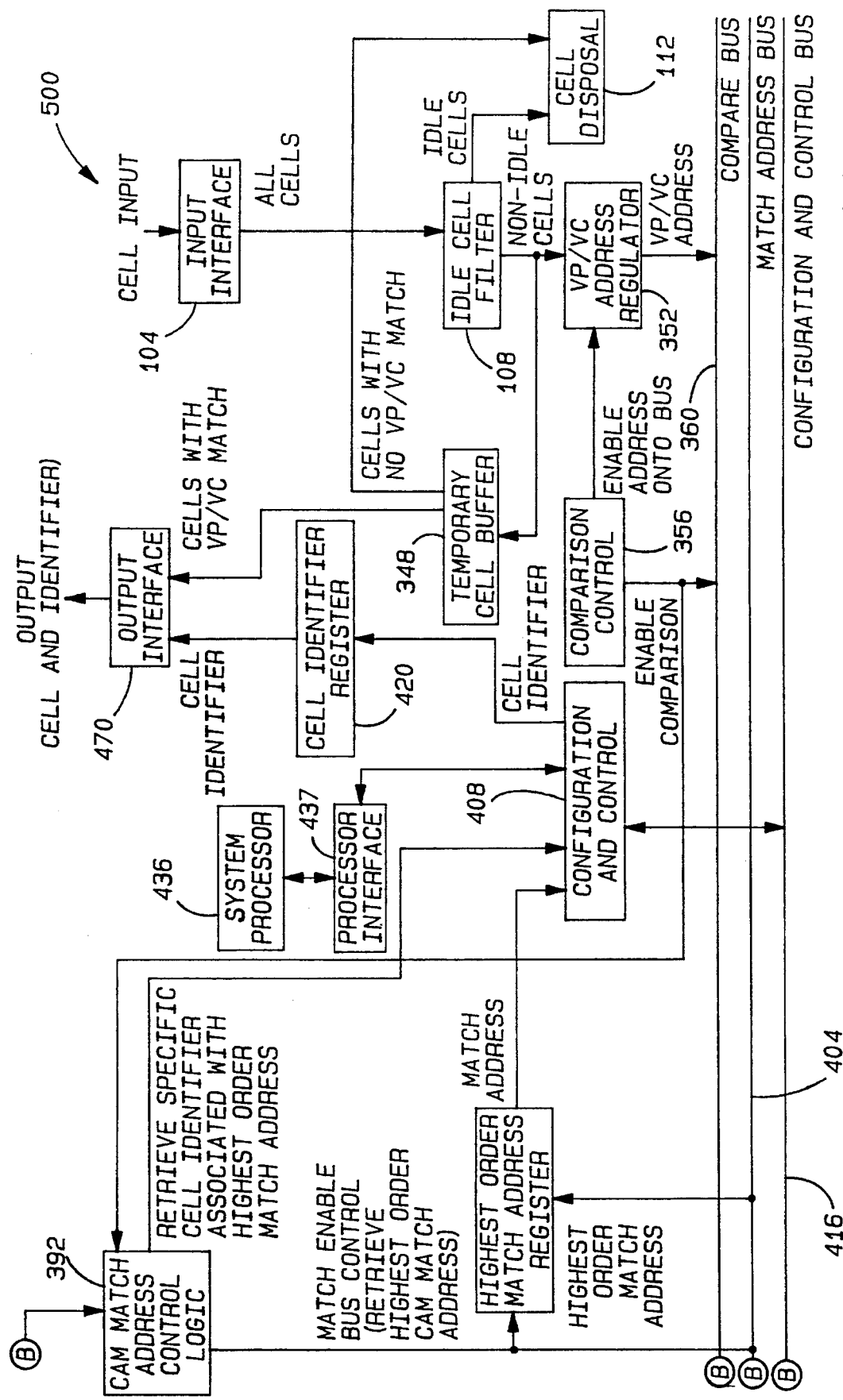

FIGS. 11A, 11B and 11C are a logical diagram of an address handling circuit 500 including sub-VP filtering and routing. Address handling circuit 500 parallels operation of address handling circuit 300 in FIG. 9. Address handling circuit 500 includes CAMs 364 and 368 corresponding to VC filter 212 and VP filter 220 and CAMs 502 and 504 corresponding to sub-VP filter 334 and sub-VP filter 308. One skilled in the art can appreciate that CAMs corresponding to sub-VP filters 318 and 326 would also be provided to obtain the operation of address handler circuit 300. For purposes of clarity, reference numbers from FIGS. 9, 10A and 10B will be used where appropriate. The functions and circuit elements perform in a manner analogous to the address handling circuit 300 of FIGS. 10A and 10B. However, there are additional sub-VP filters inserted between the VC and VP filters that take advantage of the built-in CAM functionality described above when processing ATM cells for sub-VP routing. By storing the VC headers in the highest priority CAM's, VC routing will automatically have precedence over sub-VP and VP routing. The next highest resolution sub-VP headers are stored in the next highest priority CAM's. The operation continues until the VP headers are stored in the lowest priority CAM's. With the CAM's loaded in this fashion, a cell header which has a match in each of the VP/VP CAM groups will be processed as a VC routed cell since VC CAM's have the highest priority. Likewise, a cell header which has a match in all the VP/VC CAM groups except the VC CAM's, will be processed by the highest order sub-VP routing as it has the next highest priority.

While address handling circuit 500 of FIGS. 11A, 11B, and 11C is implemented with VC, VP, and sub-VP filters or CAMs connected in parallel and with a priority circuit or system, the CAMs could be connected in series as shown in FIG. 9 if desired.

As can be appreciated, address handling circuits according to the invention provide virtual channel add/drop capability without requiring termination of virtual paths containing the added or dropped virtual channel. As such, the number of VP used in ATM switching systems can be decreased and optimal use of virtual path identifiers and bandwidth can be obtained. Furthermore, bits available for both the virtual path and channel identifiers can be optimized. Using the add/drop capability can also decrease input points requiring cell policing. Other objects, features and advantages will be readily apparent.

While VP, sub-VP and VC filters of the present invention have been described using CAMs, those skilled in the art can appreciate that other devices can be employed. For example RAM and ROM devices, discrete logic, and hash coded tables can be used if desired.

The various advantages of the present invention will become apparent to those skilled in the art after a study of the foregoing specification and following claims.

What is claimed is:

1. In an address handling circuit for an asynchronous transfer mode switch which processes a cell data stream including a plurality of cells having a header portion with a virtual channel identifier (VCI) and a virtual path identifier (VPI) and having a data payload portion, an improved address handling circuit comprising:

temporary storage means for temporarily storing at least one current cell for address processing;

virtual channel (VC) filter means, coupled to said temporary storage means and including VC address storage means for storing at least one selected VCI, corresponding VC matching data and a corresponding cell identifier, said VC filter means for comparing data from said header portion of said at least one current cell with said at least one selected VCI to identify cells matching said at least one selected VCI and including VC matching means, coupled to said VC filter means, for indicating a match;

virtual path (VP) filter means, connected to said temporary storage means and including VP address storage means for storing at least one selected VPI, corresponding VP matching data and a corresponding cell identifier, said VP filter means for comparing said data from said header portion of said at least one current cell with said at least one selected VPI to identify cells matching said at least one selected VPI and including VP matching means, coupled to said VP filter means, for indicating a match, wherein said VP filter means has lower priority than said VC filter means; and match priority means, coupled to said VC matching means of said VC filter means and said VP matching means of said VP filter means, for retrieving said matching data from a highest priority filter means having a match.

2. The improved address handling circuit of claim 1 wherein said matching data includes an address storage portion identifying an address in one of said VC address storing means and said VP address storing means and wherein said cell identifier contains routing data.

3. The improved address handling circuit of claim 1 wherein said VC filter means stores at least one selected VPI/VCI.

4. The improved address handling circuit of claim 2 further comprising:

control means connected to said match priority means for retrieving said corresponding cell identifier from one of said VC address storage means and said VP address storage means identified by said address storage portion.

5. The improved address handling circuit of claim 4 wherein said cell identifier includes routing data for said current cell.

6. The improved address handling circuit of claim 4 further comprising:

combining means, coupled to said control means, for combining said cell identifier with said current cell.

7. The improved address handling circuit of claim 6 wherein said combining means stores said cell identifier in said header portion.

8. The improved address handling circuit of claim 6 wherein said combining means appends said cell identifier at a front end of said current cell.

9. The improved address handling circuit of claim 6 wherein said combining means appends said cell identifier at a rear end of said current cell.

10. The improved address handling circuit of claim 1 further comprising:

first sub-VP filter means, coupled to said temporary storage means and including first sub-VP address storage means for storing at least one selected first sub-VPI, corresponding first sub-VPI matching data and a corresponding cell identifier, for comparing data from said header portion of said at least one current cell with said at least one selected first sub-VPI to identify cells matching said at least one selected first sub-VPI and including first sub-VPI matching means, coupled to said first sub-VP filter means, for indicating a match.

11. The improved address handling circuit of claim 10 wherein said first sub-VPI utilizes a plurality of bits of said VCI.

12. The improved address handling circuit of claim 11 wherein said first sub-VPI utilizes 12 bits of a 16 bit VCI.

13. The improved address handling circuit of claim 10 wherein said first sub-VP filter means has higher priority than said VP filter means and lower priority than said VC filter means.

14. The improved address handling circuit of claim 10 further comprising:

second sub-VP filter means, coupled to said temporary storage means and including second sub-VP address storage means for storing at least one selected second sub-VPI, corresponding second sub-VPI matching data and a corresponding cell identifier, for comparing data from said header portion of said at least one current cell with said at least one selected second sub-VPI to identify cells matching said at least one selected second sub-VPI and including second sub-VPI matching means, coupled to said second sub-VP filter means, for indicating a match.

15. The improved address handling circuit of claim 14 wherein said second sub-VPI utilizes a plurality of bits of said VCI.

16. The improved address handling circuit of claim 14 wherein said second sub-VPI utilizes 8 bits of a 16 bit VCI.

17. The improved address handling circuit of claim 14 wherein said second sub-VP filter means has higher priority than said VP filter means and lower priority than said first sub-VP filter means.

18. The improved address handling circuit of claim 14 further comprising:

third sub-VP filter means, coupled to said temporary storage means and including third sub-VP address storage means for storing at least one selected third sub-VPI, corresponding third sub-VPI matching data and a corresponding cell identifier, for comparing data from said header portion of said at least one current cell with said at least one selected third sub-VPI to identify cells matching said at least one selected third sub-VPI and including third sub-VPI matching means, coupled to said third sub-VP filter means, for indicating a match.

19. The improved address handling circuit of claim 18 wherein said third sub-VPI utilizes a plurality of bits of said VCI.

20. The improved address handling circuit of claim 18 wherein said third sub-VPI utilizes 8 bits of a 16 bit VCI.

21. The improved address handling circuit of claim 18 wherein said third sub-VP filter means has higher priority than said VP filter means and lower priority than said second sub-VP filter means.

22. The improved address handling circuit of claim 18 further comprising:

fourth sub-VP filter means, coupled to said temporary storage means and including fourth sub-VP address storage means for storing at least one selected fourth sub-VPI, corresponding fourth sub-VPI matching data and a corresponding cell identifier, for comparing data from said header portion of said at least one current cell with said at least one selected fourth sub-VPI to identify cells matching said at least one selected fourth sub-VPI and including fourth sub-VPI matching means, coupled to said fourth sub-VP filter means, for indicating a match.

23. The improved address handling circuit of claim 22 wherein said fourth sub-VPI utilizes a plurality of bits of said VCI.

24. The improved address handling circuit of claim 22 wherein said fourth sub-VPI utilizes 8 bits of a 16 bit VCI.

25. The improved address handling circuit of claim 22 wherein said fourth sub-VP filter means has higher priority than said VP filter means and lower priority than said third sub-VP filter means.

26. The improved address handling circuit of claim 22 wherein said temporary storage means includes a temporary cell buffer for storing at least one current cell; and a header register for storing data from said header portion of said at least one current cell.

27. The improved address handling circuit of claim 26 wherein said filter means include a comparand register for storing data from said header portion and said improved address handling circuit further includes comparison control means for loading said data from said header portion stored in said header register into said comparand register.

28. The improved address handling circuit of claim 22 wherein at least one of said VP filter means and said VC filter means includes a content addressable memory (CAM).

29. The improved address handling circuit of claim 28 further comprising:

processor interfacing means for interfacing said CAMs with an external processor, wherein said external processor provides configuration data, said corresponding matching data, said cell identifier, and at least one of said selected VPI, said selected VCI, said first selected sub-VPI, said second selected sub-VPI, said third selected sub-VPI, and said fourth selected sub-VPI.

30. The improved address handling circuit of claim 24 wherein at least one of said VC filter means and said VP filter means includes masking means for masking out portions of said header to allow matches on a remaining portion of said header.

31. The improved address handling circuit of claim 1 wherein said cells are fixed-length.

32. In an address handling circuit for an asynchronous transfer mode switch which processes a cell data stream including a plurality of cells having a header portion with a virtual channel identifier (VCI) and a virtual path identifier (VPI) and having a data payload portion, an improved address handling circuit comprising:

virtual channel (VC) cell routing means, connected to an ATM switch fabric, for routing cells transferred to an input thereof to said ATM switch fabric;

VC filter means, connected in said cell data stream, having a first output connected to said VC cell routing means and including a VC address storage means for storing at least one VPI/VCI, for filtering said cell data stream provided at a first input thereof to identify cells having said at least one VPI/VCI, for transferring said cells with said at least one VPI/VCI to said VC cell routing means and for transferring cells which do not have said at least one VPI/VCI to a second output thereof;

virtual path (VP) cell routing means for routing cells transferred to an input thereof to said ATM switch fabric;

VP filter means, connected in said cell data stream, having a first output connected to said VP cell routing means and including a VP address storage means for storing at least one VPI, for filtering said cell data stream provided at a first input thereof to identify cells having said at least one VPI, for transferring said cells with said at least one VPI to said VP routing means and for transferring cells which do not have said at least one VPI to a second output thereof;

first sub-VP cell routing means, connected to an ATM switch fabric, for routing cells input thereto to said ATM switch fabric; and first sub-VP filter means, having a first input connected to said second output of said VC filter means and a first output connected to said first sub-VP cell routing means, and including first sub-VP address storage means for storing at least one first sub-VP identifier (sub-VPI), for filtering cells having said at least one first sub-VPI, for transferring said cells with said at least one first sub-vP identifier to said first sub-VP cell routing means and for transferring cells which do not have said at least one first sub-VPI to a second output thereof.

33. The improved address handling circuit of claim 32 wherein said cells are fixed-length.

34. The improved address handling circuit of claim 32 further comprising:

an input interface; and idle cell filter means, having an input connected to said input interface, for removing idle cells, inserted in said data stream to maintain synchronization, from said cell data stream, wherein non-idle cells are output to said VC filter means.

35. The improved address handling circuit of claim 32 wherein an input of said VP filter means is connected to said second output of said VC filter means.

36. The improved address handling circuit of claim 32 wherein said first sub-VPI utilizes 12 bits of a 16 bit VCI.

37. The improved address handling circuit of claim 32 further comprising:

second sub-VP cell routing means, connected to an ATM switch fabric, for routing cells input thereto to said ATM switch fabric; and second sub-VP filter means, having a first input connected to said second output of said first sub-VP filter means and a first output connected to said second sub-VP cell routing means, and including second sub-VP address storage means for storing at least one second sub-VPI, for filtering cells having said at least one second sub-VPI, for transferring said cells with said at least one second sub-VP identifier to said second sub-VP cell routing means and for transferring cells which do not have said at least one second sub-VPI to a second output thereof.

38. The improved address handling circuit of claim 37 wherein said second sub-VPI utilizes 8 bits of a 16 bit VCI.

39. The improved address handling circuit of claim 37 further comprising:

third sub-VP cell routing means, connected to an ATM switch fabric, for routing cells input thereto to said ATM switch fabric; and third sub-VP filter means, having a first input connected to said second output of said first sub-VP filter means and a first output connected to said third sub-VP cell routing means, and including a third sub-VP address storage means for storing at least one third sub-VPI, for filtering cells having said at least one third sub-VPI, for transferring said cells with said at least one third sub-VPI to said third sub-VP cell routing means and for transferring cells which do not have said at least one third sub-VPI to a second output thereof.

40. The improved address handling circuit of claim 39 wherein said third sub-VPI utilizes 6 bits of a 16 bit VCI.

41. The improved address handling circuit of claim 39 further comprising:

fourth sub-VP cell routing means, connected to an ATM switch fabric, for routing cells input thereto to said ATM switch fabric; and fourth sub-VP filter means, having a first input connected to said second output of said first sub-VP filter means and a first output connected to said fourth sub-VP cell routing means, and including fourth sub-VP address storage means for storing at least one fourth sub-VPI, for filtering cells having said at least one fourth sub-VPI, for transferring said cells with said at least one fourth sub-VPI to said fourth sub-VP cell routing means and for transferring cells which do not have said at least one fourth sub-VPI to a second output thereof.

42. The improved address handling circuit of claim 41 wherein said fourth sub-VPI utilizes 4 bits of a 16 bit VCI.

43. The improved address handling circuit of claim 41 wherein said second output of said fourth sub-VP filter is connected to said first input of said VP filter means.

44. The cell filter of claim 32 further comprising:

a cell error processing circuit connected to said second output of said VP filter means.

* * * * *